US008664788B1

(12) United States Patent
Wagoner et al.

(10) Patent No.: US 8,664,788 B1
(45) Date of Patent: Mar. 4, 2014

(54) METHOD AND SYSTEMS FOR OPERATING A WIND TURBINE USING DYNAMIC BRAKING IN RESPONSE TO A GRID EVENT

(75) Inventors: Robert Gregory Wagoner, Roanoke, VA (US); Allen Michael Ritter, Roanoke, VA (US); Einar Vaughn Larsen, Charlton, NY (US); Anthony Michael Klodowski, Hardy, VA (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 13/606,530

(22) Filed: Sep. 7, 2012

(51) Int. Cl.
*F03D 9/00* (2006.01)
*H02P 9/04* (2006.01)

(52) U.S. Cl.
USPC .............................................. 290/44; 290/55

(58) Field of Classification Search
USPC ...................................................... 290/44, 55
See application file for complete search history.

(56) References Cited

U.S. PATENT DOCUMENTS

| | | | | |
|---|---|---|---|---|
| 5,070,290 A * | 12/1991 | Iwasa et al. | | 318/758 |
| 5,198,745 A | 3/1993 | Larsen et al. | | 322/58 |
| 5,907,192 A * | 5/1999 | Lyons et al. | | 290/44 |
| 6,727,603 B1 * | 4/2004 | McConnell et al. | | 307/64 |
| 6,812,586 B2 * | 11/2004 | Wacknov et al. | | 290/52 |
| 6,853,094 B2 * | 2/2005 | Feddersen et al. | | 290/44 |
| 7,126,236 B2 | 10/2006 | Harbourt et al. | | 290/44 |
| 7,239,036 B2 * | 7/2007 | D'Atre et al. | | 290/44 |
| 7,253,537 B2 * | 8/2007 | Weng et al. | | 290/44 |
| 7,423,412 B2 | 9/2008 | Weng et al. | | 322/20 |
| 7,573,732 B2 | 8/2009 | Teichmann et al. | | 363/51 |
| 7,579,702 B2 * | 8/2009 | Park et al. | | 290/44 |
| 7,586,216 B2 | 9/2009 | Li et al. | | 307/151 |
| 7,629,705 B2 * | 12/2009 | Barker et al. | | 290/55 |
| 7,786,608 B2 | 8/2010 | Menke | | 290/4 |
| 7,919,879 B2 * | 4/2011 | Flannery et al. | | 290/44 |
| 7,923,965 B2 | 4/2011 | Ritter et al. | | 320/127 |
| 7,978,445 B2 | 7/2011 | Ritter | | 361/18 |
| 8,013,461 B2 | 9/2011 | Delmerico et al. | | 290/44 |
| 8,093,740 B2 * | 1/2012 | Oohara et al. | | 290/44 |
| 8,093,741 B2 | 1/2012 | Ritter et al. | | 290/44 |
| 8,120,932 B2 | 2/2012 | Folts et al. | | 363/37 |
| 8,198,742 B2 * | 6/2012 | Jorgensen et al. | | 290/44 |
| 8,258,642 B2 * | 9/2012 | Koerber | | 290/44 |
| RE43,698 E * | 10/2012 | Hudson | | 290/44 |
| 8,432,055 B2 * | 4/2013 | Grbovic | | 290/44 |
| 8,509,958 B2 * | 8/2013 | Larsen et al. | | 700/294 |
| 8,547,715 B2 * | 10/2013 | Yuan et al. | | 363/98 |
| 2002/0079706 A1 * | 6/2002 | Rebsdorf et al. | | 290/55 |
| 2003/0151259 A1 * | 8/2003 | Feddersen et al. | | 290/44 |
| 2004/0217594 A1 * | 11/2004 | Feddersen et al. | | 290/44 |

(Continued)

*Primary Examiner* — Pedro J Cuevas
(74) *Attorney, Agent, or Firm* — Ernest G. Cusick; Frank A. Landgraff (57) ABSTRACT

A method and system for dissipating energy in a direct current (dc) bus of a doubly-fed induction generator (DFIG) converter during a grid event is described. In one aspect, the method comprises monitoring operating conditions of an electrical system, the electrical system comprising at least a DFIG generator and a line side converter and a rotor side converter connected by a dc bus having a dynamic brake connected thereto; detecting an overvoltage on the dc bus or a condition indicative of an overvoltage on the dc link is detected, the overvoltage on the dc bus or condition indicative of the overvoltage caused by a grid event; and causing energy in the dc link to be dissipated using the dynamic brake.

20 Claims, 6 Drawing Sheets

(56) References Cited

U.S. PATENT DOCUMENTS

| | | | |
|---|---|---|---|
| 2004/0217595 A1* | 11/2004 | Feddersen et al. | 290/44 |
| 2004/0217596 A1* | 11/2004 | Feddersen et al. | 290/44 |
| 2004/0222642 A1* | 11/2004 | Siebenthaler et al. | 290/44 |
| 2006/0192390 A1* | 8/2006 | Juanarena Saragueta et al. | 290/44 |
| 2007/0177314 A1* | 8/2007 | Weng et al. | 361/20 |
| 2007/0273155 A1* | 11/2007 | Barton et al. | 290/44 |
| 2007/0279815 A1* | 12/2007 | Li et al. | 361/54 |
| 2008/0291708 A1* | 11/2008 | Teichmann et al. | 363/50 |
| 2009/0206606 A1* | 8/2009 | Jorgensen et al. | 290/44 |
| 2009/0261589 A1* | 10/2009 | Oohara et al. | 290/44 |
| 2009/0278352 A1* | 11/2009 | Rivas et al. | 290/44 |
| 2010/0140939 A1* | 6/2010 | Scholte-Wassink et al. | 290/44 |
| 2011/0018270 A1* | 1/2011 | Corcelles Pereira et al. | 290/44 |
| 2011/0057443 A1* | 3/2011 | Rivas et al. | 290/44 |
| 2011/0057444 A1* | 3/2011 | Dai et al. | 290/44 |
| 2011/0089693 A1* | 4/2011 | Nasiri | 290/44 |
| 2011/0140430 A1 | 6/2011 | Ritter et al. | 290/44 |
| 2011/0175579 A1* | 7/2011 | Mazumdar | 320/167 |
| 2012/0139243 A1* | 6/2012 | Koerber | 290/44 |
| 2013/0038061 A1* | 2/2013 | Rivas et al. | 290/44 |
| 2013/0234435 A1* | 9/2013 | Wagoner et al. | 290/44 |

\* cited by examiner

METHOD AND SYSTEMS FOR OPERATING A WIND TURBINE USING DYNAMIC BRAKING IN RESPONSE TO A GRID EVENT

BACKGROUND

The field of the disclosure relates generally to methods and systems for use in controlling operation of a wind turbine, and more specifically, to controlling the operation of a wind turbine using dynamic braking in response to an islanding event.

Generally, wind turbine systems regulate a positive sequence voltage with a closed-loop current regulation scheme that minimizes negative sequence current. Such systems work well and are known to be reliable at constant output power levels. However, as the length of transmission line feeder to the DFIG wind turbine system is increased, response to grid transients and grid disturbances causes oscillations of power into and out of the converter which create disturbances on the DC bus voltage in the converter. Such power oscillations may, over time, lead to degradation of system controllability and/or equipment malfunctions. In some grid faults, upon clearing, the wind plant is left with no remaining connection to the grid, but still with the wind turbines connected to the cables and lines of the wind plant and at least a portion of a long transmission grid. This can be considered an "islanded" condition for the wind park that is characterized by potentially significant deviations in voltage and frequency. This condition is not to be confused with other usages of the term "islanding," where the intent is to ensure safety of maintenance personnel.

The above-described events pose a potential for damage to the wind turbine electrical system due to high voltages within that system that exceed equipment capability. It is desirable for the wind turbine to ride through the grid events, both low-voltage and high-voltage, when the grid remains partially intact after clearing the grid fault. However, when the grid becomes open-circuited after clearing the fault, then it is desirable that the wind turbines continue operating without damage and eventually shut down based on inability to transfer power.

One control method for regulating the power flow during some grid disturbances involves operating a "rotor crowbar," which is used as a last resort to limit power flow into the DC bus of the converter to keep the converter from being damaged. Generally; however, such a system does not allow the wind turbine system to recover fast enough to meet the some grid code standards and/or regulations. With existing control methods, as longer transmission line lengths are desired, possibly coupled with larger grid voltage transients, the voltage overshoots on the DC bus voltage in the converter may reach a level to damage the components in the converter.

Accordingly, a need exists to more effectively control wind turbine systems using dynamic braking to protect electrical equipment from disturbances caused by the power grid.

BRIEF DESCRIPTION

In one aspect, a method of dissipating energy in a direct current (dc) bus of a doubly-fed induction generator (DFIG) converter during a grid event is provided. One embodiment of the method comprises monitoring operating conditions of an electrical system, the electrical system comprising at least a DFIG generator and a line side converter and a rotor side converter connected by a dc bus having a dynamic brake connected thereto; detecting an overvoltage on the dc bus or a condition indicative of an overvoltage on the dc link is detected, the overvoltage on the dc bus or condition indicative of the overvoltage caused by a grid event; and causing energy in the dc link to be dissipated using the dynamic brake.

In another aspect, a method of dissipating energy in a direct current (dc) bus of a doubly-fed induction generator (DFIG) converter during an islanding event is provided. One embodiment of the method comprises detecting an indicator of islanding of a DFIG generator and a DFIG converter, the DFIG converter comprising a line side converter and a rotor side converter connected by a dc bus having a dynamic brake connected thereto where the DFIG generator and line side converter connected to at least a portion of an electrical grid subsequent to the islanding; and causing energy in the dc bus of the DFIG converter to be dissipated based on the detected indicator of islanding condition, the energy dissipated using the dynamic brake.

In another embodiment, a system for dissipating energy in a direct current (dc) bus of a doubly-fed induction generator (DFIG) converter during a grid event is provided. One embodiment of the system comprises a DFIG generator coupled to a utility grid via a dual path, the dual path defined by a stator bus and a rotor bus; a DFIG converter coupled to the generator via rotor bus and coupled to the utility grid via a line bus, the DFIG converter comprising a line side converter and a rotor side converter connected by a dc bus having a dynamic brake connected thereto; and a controller, wherein the controller is configured to receive and transmit signals to and from an electrical system comprising at least the utility grid, DFIG generator and the DFIG converter, the controller further configured to: monitor operating conditions of the utility grid, DFIG generator, line side converter, rotor side converter, dc bus and dynamic brake; detect an overvoltage on the dc bus or a condition indicative of an overvoltage on the dc link, the overvoltage on the dc bus or condition indicative of the overvoltage caused by a grid event; and cause energy in the dc link to be dissipated using the dynamic brake.

BRIEF DESCRIPTION OF THE DRAWINGS

A full and enabling disclosure of embodiments of the present invention, including the best mode thereof, directed to one of ordinary skill in the art, is set forth in the specification, which makes reference to the appended figures, in which.

DETAILED DESCRIPTION

Before the present methods and systems are disclosed and described, it is to be understood that the methods and systems are not limited to specific synthetic methods, specific components, or to particular compositions. It is also to be understood that the terminology used herein is for describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As used herein, the term "wind turbine" refers to any device that generates rotational energy from wind energy, and more specifically, converts the kinetic energy of wind into mechanical energy. As used herein, the term "wind turbine generator" refers to any wind turbine that generates electrical power from rotational energy generated from wind energy, and more specifically, converts mechanical energy converted from kinetic energy of wind to electrical power.

As used herein, the terms "disturbance," "grid disturbance," "fault," "system fault," "transient" and other similar terms generally refer to any event that causes perturbations in the input signal from the electric/power grid. For example, such disturbances can include impulses, notches, glitches, momentary interruptions, voltage sag/swells, harmonic distortions, flickers, and islanding where the wind turbine generator is left with no remaining connection to the grid, but still with the wind turbine generator connected to the cables and lines of the wind plant and at least a portion of a long transmission grid. Generally, the grid signal is a three-phase signal that includes sequence components having particular frequencies. The three-phase signal includes positive sequence components, negative sequence components, and zero or neutral sequence components. Each of the components includes frequency information, phase information, and magnitude information. Typically, wind turbine systems regulate a positive sequence voltage with a closed-loop current regulation scheme that minimizes negative sequence current. Such systems work well and are known to be reliable at constant output power levels. However, as the length of transmission line feeder to a wind turbine generator is increased, response to grid transients and grid disturbances may cause oscillations of power into and out of the converter, which can create disturbances on the DC bus voltage in the converter. Such power oscillations may, over time, lead to degradation of system controllability and/or equipment malfunctions. The present methods and systems may be understood more readily by reference to the following detailed description of preferred embodiments and the Examples included therein and to the Figures and their previous and following description.

Generally disclosed herein are systems and methods of responding to a high-voltage grid event on an electrical system connected with one or more DFIGs.

Figure 1:
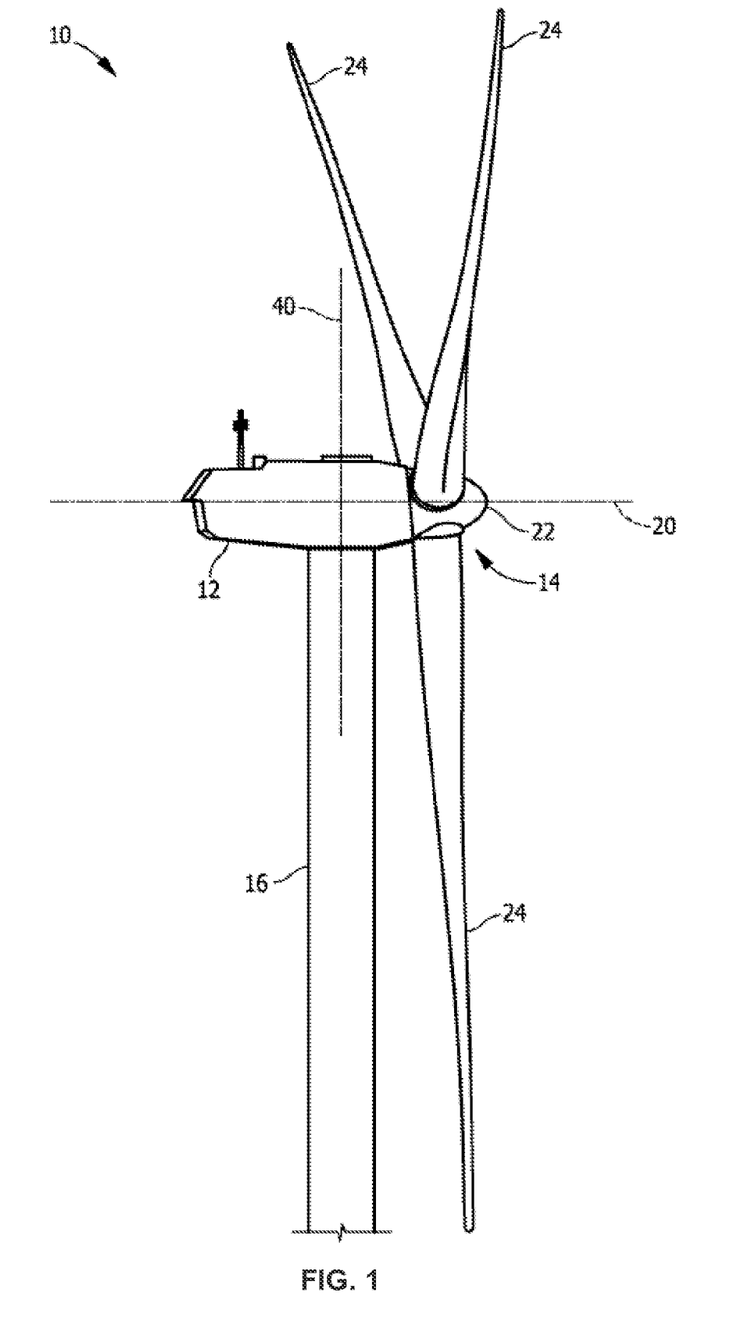
FIG. 1 is a perspective view of a portion of an exemplary wind turbine.

FIG. 1 is a perspective view of an exemplary wind turbine 10. In the exemplary embodiment, wind turbine 10 is a wind turbine generator that generates electrical power from wind energy. Wind turbine 10 may have a horizontal-axis configuration, however, in an alternative embodiment wind turbine 10 includes, in addition to, or in the alternative to, the horizontal-axis configuration, a vertical-axis configuration. In the exemplary embodiment, wind turbine 10 is coupled to an electrical load, such as, but not limited to, an electric/power grid, for receiving electrical power therefrom to drive operation of wind turbine 10 and/or its associated components and/or for supplying electrical power generated by wind turbine 10 thereto. Although only one wind turbine 10 is shown in FIG. 1, a plurality of wind turbines 10 may be grouped together, sometimes referred to as a "wind farm" or a "wind park."

Wind turbine 10 includes a body or nacelle 12 and a rotor 14 coupled to nacelle 12 for rotation with respect to nacelle 12 about an axis of rotation 20. In the exemplary embodiment, nacelle 12 is mounted on a tower 16. In an alternative embodiment, nacelle 12 may be positioned adjacent to the ground and/or adjacent to a surface of water. A height of tower 16 may be selected to be any suitable height that enables wind turbine 10 to function as described herein. Rotor 14 includes a hub 22 and a plurality of blades 24 that extend radially outwardly from hub 22 for converting wind energy into rotational energy. Although rotor 14 is shown as having three blades 24, rotor 14 may have any number of blades 24.

Figure 2:
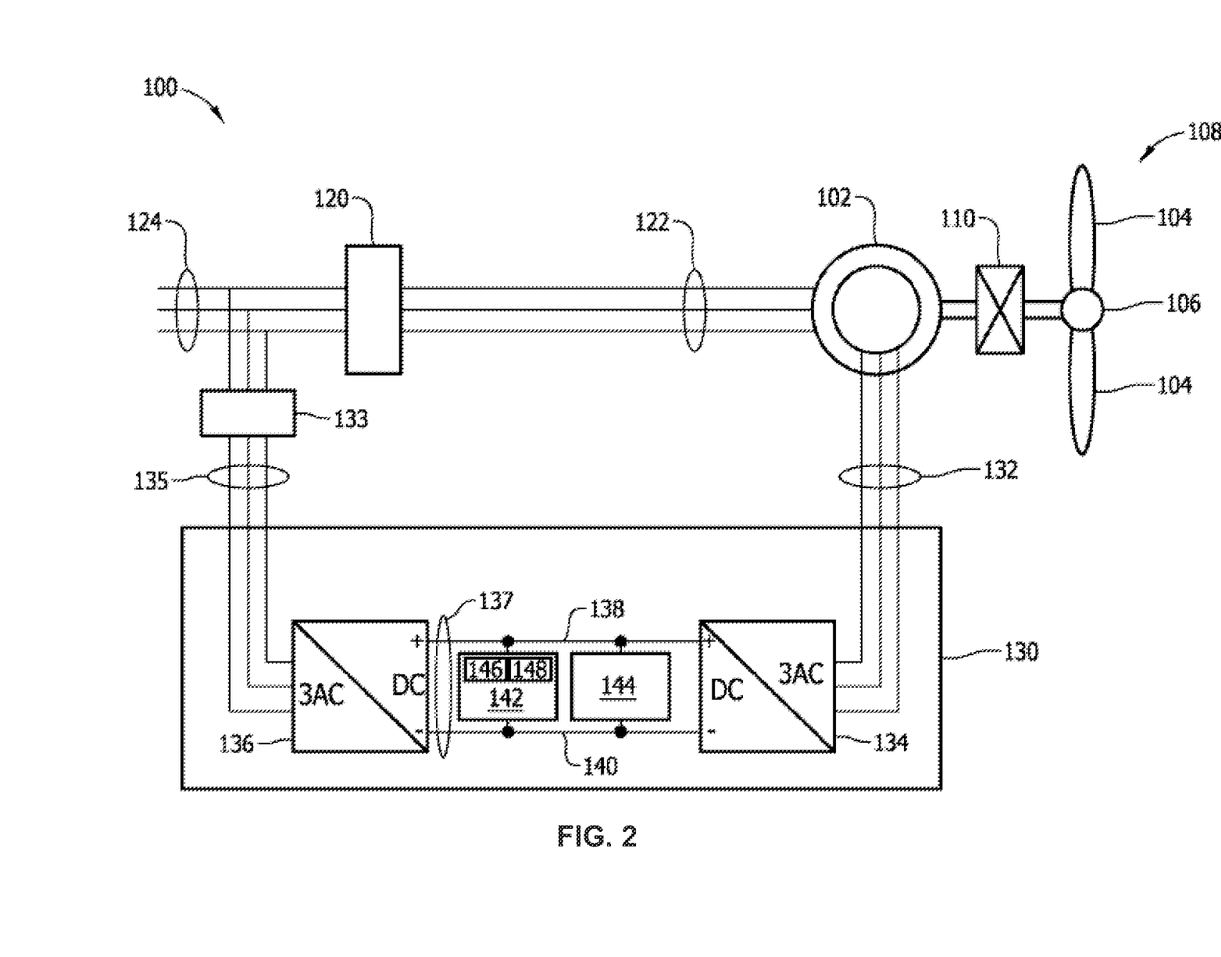
FIG. 2 is a schematic of an exemplary generator control system including a doubly fed induction generator (DFIG) that may be used with the wind turbine shown in FIG. 1.

FIG. 2 is a schematic of an exemplary generator control system 100 that includes a doubly fed induction generator (DFIG) 102 that may be used with wind turbine 10, shown in FIG. 1. In the exemplary embodiment, generator control system 100 includes a plurality of rotor blades 104 coupled to a rotating hub 106, which together generally define a rotor 108. Rotor 108 is coupled to a gear box 110, which is coupled to a generator 102. In the exemplary embodiment, generator 102 is a DFIG or a wound rotor generator.

In the exemplary embodiment, generator 102 is coupled to a stator-synchronizing switch 120 via a stator bus 122. Stator-synchronizing switch 120 is coupled to power grid 124. Generator 102 is also coupled to a power conversion component 130 via a rotor bus 132. In the exemplary embodiment, power conversion component 130 is coupled to a conversion circuit breaker 133 via a line bus 135, and conversion circuit breaker 150 is coupled to grid 124. In the exemplary embodiment, stator bus 122 outputs three-phase power from a stator of generator 102 and rotor bus 132 outputs three-phase power from a rotor of generator 102, though any number of phases are contemplated within the scope of embodiments of the present invention.

Power conversion component 130 includes a rotor-side converter 134 and a line-side converter 136. In one aspect, rotor-side converter 134 and line-side converter 136 can be configured for a normal operating mode in a three-phase, two level, Pulse Width Modulation (PWM) arrangement. Rotor-side converter 134 and line-side converter 136 are coupled together via a direct current (DC) bus 137 having a positive link 138 and a negative link 140. In the exemplary embodiment, a dynamic brake 142 and a DC bus capacitor 144 are coupled to DC bus 137, between rotor-side converter 134 and line-side converter 136.

In one exemplary embodiment, dynamic brake 142 includes a fully controllable switch 146 placed in series with a resistor 148. In one exemplary embodiment, switch 146 is a semiconductor such as an Insulated Gate Bipolar Transistor (IGBT) or any other electronic gated switch. In one embodiment, a diode is coupled in parallel with switch 146. In an alternative embodiment, a diode is coupled in parallel with the resistor 148. In another embodiment, a diode is coupled in parallel with both switch 146 and resistor 148. Alternatively, diode placement within dynamic brake 142 is not limited to a single diode, but rather any number of diodes can be coupled in any parallel combination of switch 146 and resistor 148 that enables a wind turbine 10 to operate as described herein.

In operation, power generated at generator 102 is provided via a dual path to grid 124. The dual paths are defined via stator bus 122 and rotor bus 132. In the exemplary embodiment, sinusoidal three-phase alternating current (AC) power is converted to direct current (DC) power on rotor bus 132 via power conversion component 130. Converted power supplied from power conversion component 130 is combined with the power supplied from generator 102 to provide three-phase power at a frequency that is maintained substantially constant. In one embodiment, the frequency is maintained at about 60 Hertz AC, 50 Hertz AC, and the like. Alternatively, the frequency can be maintained at any level that enables operation of wind turbine 10 as described herein.

Figure 3A:
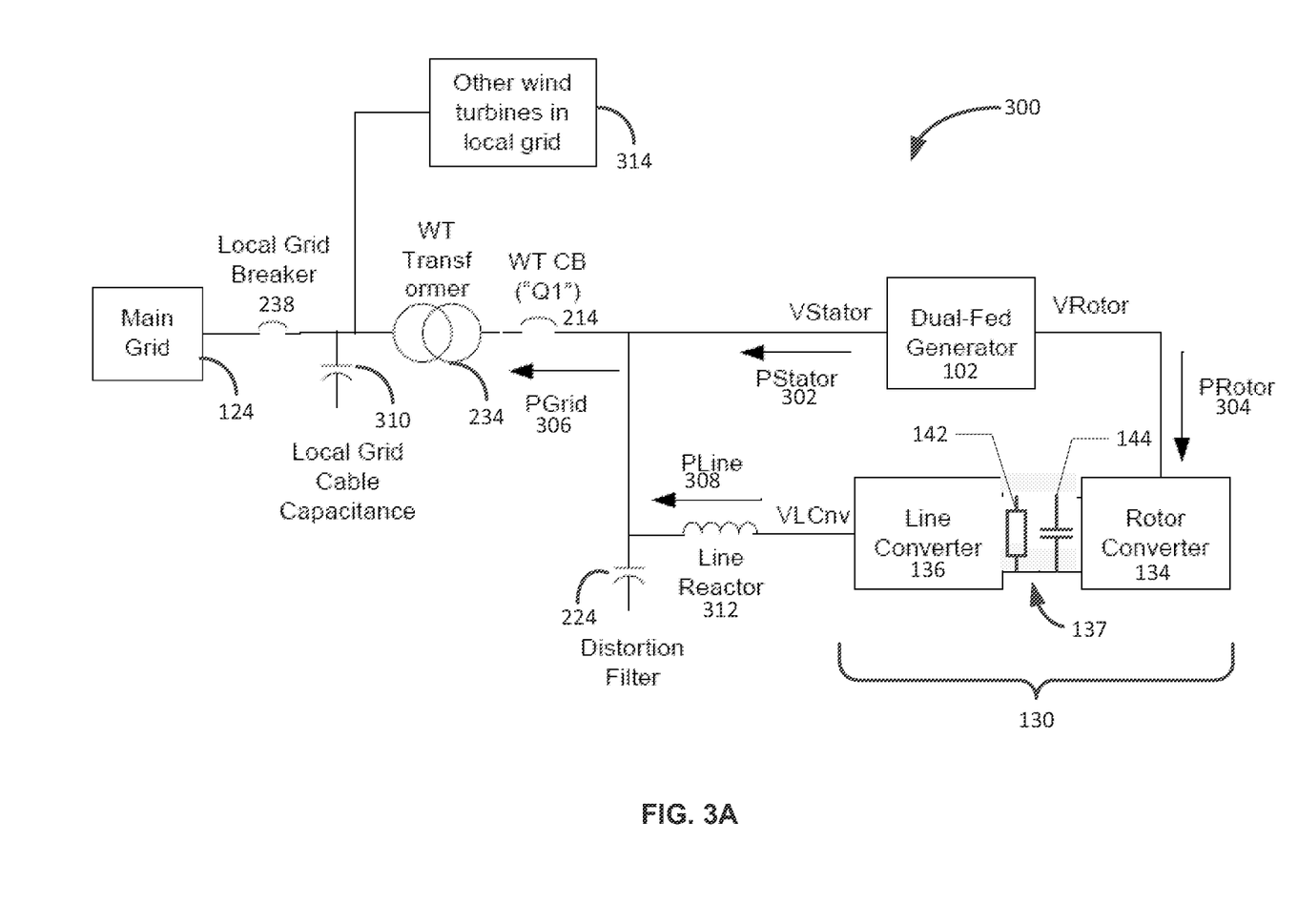
FIG. 3A illustrates the normal operating condition of a wind turbine in a wind park.

The normal operating condition of a wind turbine in a wind park is illustrated in FIG. 3A. This figure shows power flows within the converter 130 and the wind park electrical system 300 during super-synchronous operation typical of moderate to high wind conditions. The power from the DFIG 102 splits in two paths, one power flow (PStator) 302 flows directly from the stator of the generator 102 through a wind turbine circuit breaker 214, wind turbine transformer 234 and local grid breaker 238 into the grid connection 124. The other power flow (PRotor) 304 from DFIG 102 flows via the rotor of the generator 102, which passes though the rotor converter 134, to the dc link 137, to the line converter 136, through a line reactor 312 (not required) and then on to the grid connection point 124 via the wind turbine circuit breaker 214, wind turbine transformer 234 and the local grid breaker 238. The sum (Pgrid) 306 of these two power flows 302, 304 is the net output of the generator 102. Note that the split of power between the generator 102 rotor and stator is a function of rotor speed relative to synchronous. Similarly, power from other wind turbines 314 in the wind park can flows from the local grids of each additional wind turbine 314 to the grid connection point 124. At super-synchronous operation the rotor speed is higher than synchronous and the power splits as shown. At sub-synchronous operation the rotor speed is less than synchronous and the rotor winding draws power from the rotor converter 134, i.e. the power flows through the converters 136, 134 into the rotor of the generator 102.

Figure 3B:
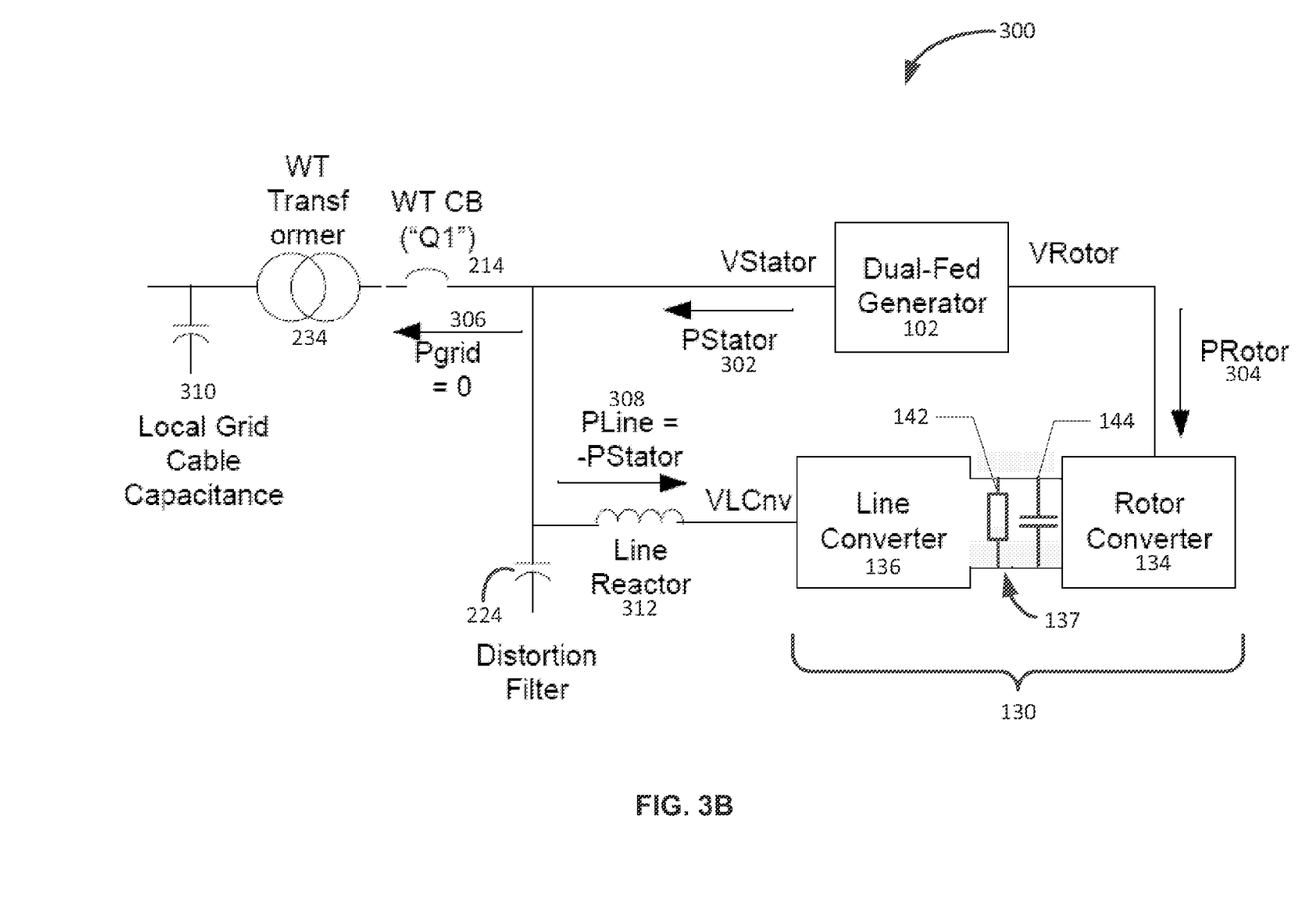
FIG. 3B illustrates the conditions when a remote breaker opens leaving the wind park in an islanded condition and the power flow to the grid is suddenly interrupted for a case where the rotor torque and speed remain substantially the same as pre-islanding condition.

FIG. 3B illustrates the conditions when a remote breaker opens leaving the wind park in an islanded condition and the power flow to the grid 124 is suddenly interrupted for a case where the rotor torque and speed remain substantially the same as pre-islanding conditions. The power (PLine) 308 on the line converter 136 is suddenly forced to reverse, since the power that was flowing from the DFIG 102 stator to the grid 124 now has only the line converter 136 as a path. This causes the voltage on the dc link 137 to rise very rapidly. When an islanded condition occurs, it is desirable to disconnect the wind turbine system 300 from the grid 124 in a manner that does not cause damage to components of the electrical system 300. However, damage to components can happen in a few milliseconds, which is typically faster than circuit breakers can operate. Also, the remote breaker opening may leave some portion of the local grid connected to the generator 102, e.g. cables that make up the wind park collector system, a portion of the transmission grid 124, and the like. The capacitance 310 of the remaining connected grid can be a source of ac voltage amplification on the remaining network. Control action is needed quickly to prevent damaging voltage levels and there is a need to dissipate energy in the system 300 during the control process. In some aspects, a controller or other computing device can be used to detect conditions on the electrical system 300 or grid 124 indicative of an overvoltage on the dc link 137 or that would cause an overvoltage on the dc link 137 and cause the switch 146 of the dynamic brake 142 to allow current to pass through the switch 146 and energy be at least partially dissipated by the resistor of the dynamic brake 142.

In one aspect, the dynamic brake 142 can be selectively activated on the level of the DC bus voltage in converter 130. For example, voltage on the dc link 137 can be monitored by a controller or other computing device and if it reaches or exceeds a threshold the switch 146 of the dynamic brake 142 can be caused by the controller or other computing device to allow current to pass through the switch 146 and be at least partially dissipated by the resistor of the dynamic brake 142. In one aspect, the switch 146 stays in a conducting state until the voltage on the dc bus 137 drops below the threshold, the resistor approaches a thermal limit, or other monitored operational conditions cause the switch 146 to be placed in a non-conducting state. In another aspect, the switch 146 acts as a chopper and switches between a conducting and non-conducting state. An alternate control scheme includes monitoring AC voltage and/or current on the remaining connected grid portion of the electrical system in a feedback loop using the controller or other computing device and timing the operation of the switch 146 in the dynamic brake circuit such that oscillations between the grid and the dc link 137 are reduced. Furthermore, embodiments of the dynamic brake 142 as described herein can be used to dissipate overvoltages or energy on the dc link 137, which allows the usable speed range of the wind turbine generator 102 to be expanded as the response time of the pitch control system, when responding to grid fluctuations, can be reduced by allowing the dynamic brake 142 to dissipate energy caused by the fluctuations.

Figure 4:
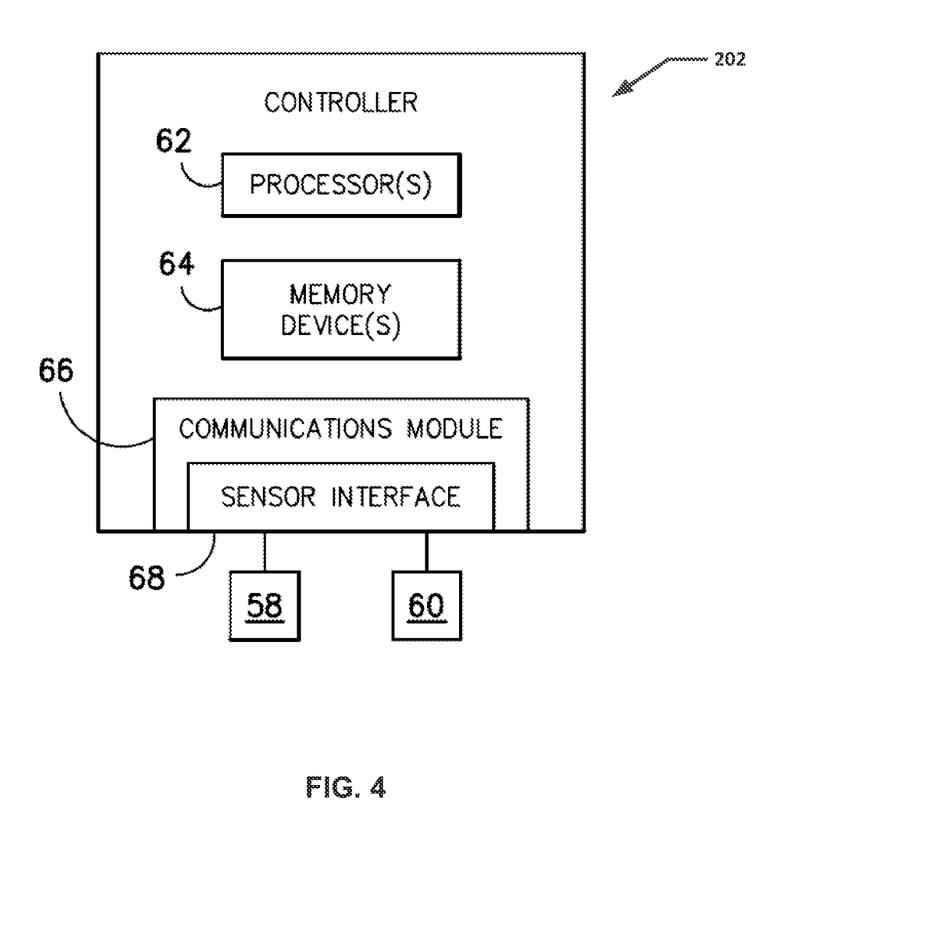
FIG. 4 illustrates a block diagram of one embodiment of suitable components that may be included within an embodiment of a controller, or any other computing device that receives signals indicating a high-voltage grid event in accordance with aspects of the present subject matter.

Referring now to FIG. 4, some embodiments of systems for dissipating energy in a dc link of a DFIG converter caused by an islanding condition can include a control system or controller 202. In general, the controller 202 may comprise a computer or other suitable processing unit. Thus, in several embodiments, the controller 202 may include suitable computer-readable instructions that, when implemented, configure the controller 202 to perform various different functions, such as receiving, transmitting and/or executing control signals. As such, the controller 202 may generally be configured to control the various operating modes (e.g., conducting or non-conducting states) of the one or more switches 146 and/or components of embodiments of the electrical system 300. For example, the controller 202 may be configured to implement methods of dissipating energy in a dc link of a DFIG converter caused by an islanding condition.

FIG. 4 illustrates a block diagram of one embodiment of suitable components that may be included within an embodiment of a controller 202, or any other computing device that receives signals indicating grid conditions in accordance with aspects of the present subject matter. In various aspects, such signals can be received from one or more sensors or transducers 58, 60, or may be received from other computing devices (not shown) such as a supervisory control and data acquisition (SCADA) system, a turbine protection system, PLL regulator, and the like. Received signals can include, for example, voltage signals such as DC bus 137 voltage and AC grid voltage, corresponding phase angles for each phase of the AC grid, current signals, power flow (direction) signals, power output from the converter system 130, total power flow into (or out of) the grid, and the like. In some instances, signals received can be used by the controller 202 to calculate other variables such as changes in voltage phase angles over time, and the like. As shown, the controller 202 may include one or more processor(s) 62 and associated memory device(s) 64 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 64 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 64 may generally be configured to store suitable computer-readable instructions that, when implemented by the processor(s) 62, configure the controller 202 to perform various functions including, but not limited to, directly or indirectly transmitting suitable control signals to one or more switches that comprise the bi-directional power conversion assembly 130, switches of the dynamic brake 142, monitoring operating conditions of the electrical system 300, and various other suitable computer-implemented functions.

Additionally, the controller 202 may also include a communications module 66 to facilitate communications between the controller 202 and the various components of the electrical system 300 including the one or more sources of electrical generation 102. For instance, the communications module 66 may serve as an interface to permit the controller 202 to transmit control signals to the bi-directional power conversion assembly 130, dynamic brake 142, and/or other components of the wind turbine and electrical system. Moreover, the communications module 66 may include a sensor interface 68 (e.g., one or more analog-to-digital converters) to permit signals transmitted from the sensors (e.g., 58, 60) to be converted into signals that can be understood and processed by the processors 62. Alternatively, the controller 202 may be provided with suitable computer readable instructions that, when implemented by its processor(s) 62, configure the controller 202 to take various actions depending upon the control mode of the wind turbine. For example, in normal operation (i.e., rotor control), the rotor converter has dominant control over the flow of real and reactive power from the generator. The line converter acts primarily to regulate dc link voltage by adjusting the real power exchange to the grid connection point. The line converter can also draw reactive current from the grid in case of high ac voltage. If a grid event is detected by the controller 202, then the operation mode can change such that the switch 146 of the dynamic brake 142 is caused to conduct in order to protect the converters 134, 136 and other electrical components.

Figure 5A:
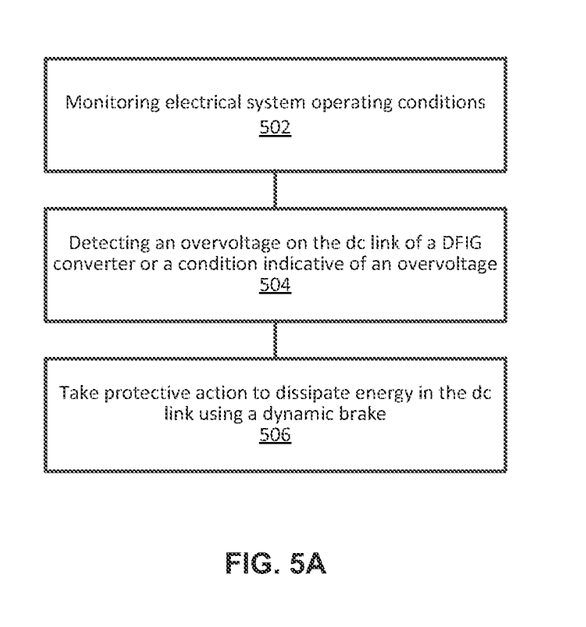
FIG. 5A is a flow chart of an exemplary method of controlling dc bus voltages of a DFIG converter during a grid event such as islanding.

FIG. 5A is a flow chart of an exemplary method of dissipating energy in a dc bus of a DFIG converter during a grid event such as islanding. Steps of the flowchart may be implemented by the controller 202 or other suitable computing devices. In the exemplary embodiment, method includes step 502, monitoring electrical system operating conditions. In one aspect, monitoring electrical system operating conditions comprises monitoring voltage on the dc link 137 by a controller or other computing device. In another aspect, AC voltage and/or current on the remaining connected grid portion of the electrical system can be monitored in a feedback loop using the controller or other computing device. At step 504, an overvoltage on the dc link 137 is detected or a condition indicative of an overvoltage on the dc link is detected such as, for example, high ac voltage, high ac current and the like. For example, the overvoltage, high ac voltage or high ac current may be 1%, 5% 10%, 50%, 150% or greater, and any values therebetween, of the measured voltage or current over the nominal voltage or current. At step 506, protective action is taken using the dynamic brake to dissipate energy in the dc link of the DFIG converter. For example, if the monitored voltage on the dc link reaches or exceeds a threshold, the switch 146 of the dynamic brake 142 can be caused by the controller or other computing device to allow current to pass through the switch 146 and energy be at least partially dissipated by the resistor of the dynamic brake 142. In one aspect, the switch 146 stays in a conducting state until the voltage on the dc bus 137 drops below the threshold, the resistor approaches a thermal limit, or other monitored operational conditions cause the switch 146 to be placed in a non-conducting state. In another aspect, the switch 146 acts as a chopper and switches between a conducting and non-conducting state. In another aspect, AC voltage and/or current on the remaining connected grid portion of the electrical system is monitored in a feedback loop using the controller or other computing device and timing the operation of the switch 146 in the dynamic brake circuit such that oscillations between the grid and the dc link 137 are reduced. Though not shown in FIG. 5A, in one aspect, the above-described process is carried out upon detecting islanding or upon receiving, by the controller, one or more early indicators of islanding of the wind turbine generator such as high ac voltage, high dc link voltage, frequency and/or phase shifts, and the like. Such a process may be carried out concurrently while the controller or other computing device is making a determination whether the grid event comprises an islanding event. In one aspect, islanding can be detected by detecting that the grid connections have all been lost, leaving the wind plant in an islanded condition. There are several ways to do this including, for example, standard wind turbine monitor and protection functions, including grid frequency deviation, grid voltage deviation, measured torque not following commanded torque for a predetermined time, turbine overspeed, tower vibration, etc. Another way of detecting that grid connections have been lost includes special monitoring functions enacted by the high-voltage condition, e.g. increasing the sensitivity of existing functions such as frequency and voltage deviations. And yet another way of detecting loss of grid connections includes receiving a signal from an external device that knows status of the grid connections.

Figure 5B:
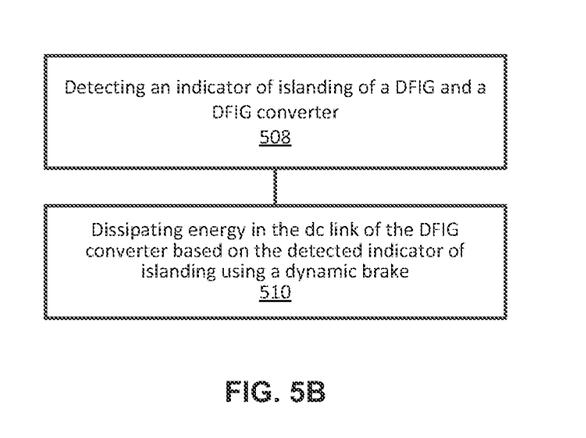
FIG. 5B is a flow chart of an exemplary method of dissipating energy in a direct current (dc) bus of a doubly-fed induction generator (DFIG) converter during an islanding event.

FIG. 5B is a flow chart of an exemplary method of dissipating energy in a direct current (dc) bus of a doubly-fed induction generator (DFIG) converter during an islanding event. Aspects of the steps of the process can be performed by a computing device such as controller 202 as described herein. One embodiment of the method comprises step 508, detecting an indicator of islanding of a DFIG generator and a DFIG converter where the DFIG converter comprises at least a line side converter and a rotor side converter connected by a dc bus having a dynamic brake connected thereto. The DFIG generator and line side converter are connected to at least a portion of an electrical grid subsequent to the islanding. In one aspect, detecting an indicator of islanding of the DFIG generator and DFIG converter comprises detecting an indicator of islanding by one or more of grid frequency deviation, grid voltage deviation, measured torque not following commanded torque for a predetermined time, turbine overspeed, tower vibration, receiving a signal from an external device indicating status of grid connections, and the like. At step 510, energy in the dc bus of the DFIG converter is caused to be dissipated based on the detected indicator of islanding condition, the energy dissipated using the dynamic brake. In one aspect, causing energy in the dc link to be dissipated using the dynamic brake comprises determining that a monitored voltage on the dc link reaches or exceeds a threshold and causing a switch of the dynamic brake to allow current to pass through the switch and energy be at least partially dissipated by a resistor of the dynamic brake. In another aspect, causing energy in the dc link to be dissipated using the dynamic brake comprises monitoring alternating current (AC) voltage or current on the portion of the electrical grid connected to the DFIG generator and the line side converter and timing operation of a switch in the dynamic brake such that oscillations between the portion of the electrical grid and the dc link are reduced.

It is to be noted that the above embodiments of systems and methods can be used to dissipate energy in the dc link of a DFIG converter regardless of whether the converter, generator or other components of the electrical system are energized and/or operating or whether they are not.

As described above and as will be appreciated by one skilled in the art, embodiments of the present invention may be configured as a system, method, or a computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) 62 discussed above with reference to FIG. 4, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) 62 of FIG. 4) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of dissipating energy in a direct current (dc) bus of a doubly-fed induction generator (DFIG) converter during a grid event, said method comprising:
monitoring, by a controller, operating conditions of an electrical system, said electrical system comprising at least a DFIG generator and a line side converter and a rotor side converter connected by a dc bus having a dynamic brake connected thereto;
detecting, by the controller, an overvoltage on the dc bus or a condition indicative of an overvoltage on the dc link is detected, said overvoltage on the dc bus or condition indicative of the overvoltage caused by a grid event; and
causing, by the controller, energy in the dc link to be dissipated using the dynamic brake.

2. The method of claim 1, wherein monitoring, by the controller, operating conditions of the electrical system comprises monitoring voltage on the dc link.

3. The method of claim 1, wherein monitoring, by the controller, operating conditions of the electrical system comprises monitoring alternating current (AC) voltage or current on at least a portion of an electrical grid connected to the DFIG generator the line side converter.

4. The method of claim 1, wherein detecting, by the controller, a condition indicative of an overvoltage on the dc link comprises detecting a high alternating current (AC) voltage or current on at least a portion of an electrical grid connected to the DFIG generator the line side converter.

5. The method of claim 1, wherein causing, by the controller, energy in the dc link to be dissipated using the dynamic brake comprises determining that the monitored voltage on the dc link reaches or exceeds a threshold and causing a switch of the dynamic brake to allow current to pass through the switch and energy be at least partially dissipated by a resistor of the dynamic brake.

6. The method of claim 1, wherein causing, by the controller, energy in the dc link to be dissipated using the dynamic brake comprises monitoring alternating current (AC) voltage or current on at least a portion of an electrical grid connected to the DFIG generator and the line side converter and timing operation of a switch in the dynamic brake such that oscillations between the portion of the electrical grid and the dc link are reduced.

7. The method of claim 1, wherein detecting, by the controller, the overvoltage on the dc bus or condition indicative of the overvoltage caused by a grid event comprises detecting the overvoltage on the dc bus or condition indicative of the overvoltage caused by islanding.

8. A method of dissipating energy in a direct current (dc) bus of a doubly-fed induction generator (DFIG) converter during an islanding event, said method comprising:
detecting, by a controller, an indicator of islanding of a DFIG generator and a DFIG converter, said DFIG converter comprising a line side converter and a rotor side converter connected by a dc bus having a dynamic brake connected thereto, said DFIG generator and line side converter connected to at least a portion of an electrical grid subsequent to the islanding; and
causing, by the controller, energy in the dc bus of the DFIG converter to be dissipated based on the detected indicator of islanding condition, said energy dissipated using the dynamic brake.

9. The method of claim 8, wherein detecting, by the controller, the indicator of islanding of a DFIG generator and a DFIG converter comprises detecting the indicator of islanding by one or more of grid frequency deviation, grid voltage deviation, measured torque not following commanded torque for a predetermined time, turbine overspeed, tower vibration, or receiving a signal from an external device indicating status of grid connections.

10. The method of claim 8, wherein causing, by the controller, energy in the dc link to be dissipated using the dynamic brake comprises determining that a monitored voltage on the dc link reaches or exceeds a threshold and causing a switch of the dynamic brake to allow current to pass through the switch and energy be at least partially dissipated by a resistor of the dynamic brake.

11. The method of claim 8, wherein causing, by the controller, energy in the dc link to be dissipated using the dynamic brake comprises monitoring alternating current (AC) voltage or current on the portion of the electrical grid connected to the DFIG generator and the line side converter and timing operation of a switch in the dynamic brake such that oscillations between the portion of the electrical grid and the dc link are reduced.

12. A system for dissipating energy in a direct current (dc) bus of a doubly-fed induction generator (DFIG) converter connected to a wind turbine during a grid event, the system comprising:
a DFIG generator coupled to a utility grid via a dual path, said dual path defined by a stator bus and a rotor bus;
a DFIG converter coupled to said generator via a rotor bus and coupled to the utility grid via a line bus, said DFIG converter comprising a line side converter and a rotor side converter connected by a dc bus having a dynamic brake connected thereto; and
a controller, wherein the controller is configured to receive and transmit signals to and from an electrical system comprising at least the utility grid, DFIG generator and the DFIG converter, said controller further configured to:
monitor operating conditions of the utility grid, DFIG generator, line side converter, rotor side converter, dc bus and dynamic brake;
detect an overvoltage on the dc bus or a condition indicative of an overvoltage on the dc link, said overvoltage on the dc bus or condition indicative of the overvoltage caused by a grid event; and
cause energy in the dc link to be dissipated using the dynamic brake.

13. The system of claim 12, wherein monitoring, by the controller, operating conditions of the electrical system comprises monitoring voltage on the dc link.

14. The system of claim 12, wherein monitoring, by the controller, operating conditions of the electrical system comprises monitoring alternating current (AC) voltage or current on at least a portion of the utility grid connected to the DFIG generator and the line side converter.

15. The system of claim 12, wherein detecting, by the controller, a condition indicative of an overvoltage on the dc link comprises detecting a high alternating current (AC) voltage or current on at least a portion of the utility grid connected to the DFIG generator and the line side converter.

16. The system of claim 12, wherein causing, by the controller, energy in the dc link to be dissipated using the dynamic brake comprises determining that the monitored voltage on the dc link reaches or exceeds a threshold and causing a switch of the dynamic brake to allow current to pass through the switch and energy be at least partially dissipated by a resistor of the dynamic brake.

17. The system of claim 12, wherein causing, by the controller, energy in the dc link to be dissipated using the dynamic brake comprises monitoring alternating current (AC) voltage or current on at least a portion of the utility grid connected to the DFIG generator and the line side converter and timing operation of a switch in the dynamic brake such that oscillations between the portion of the utility grid and the dc link are reduced.

18. The system of claim 12, wherein detecting, by the controller, the overvoltage on the dc bus or condition indicative of the overvoltage caused by a grid event comprises detecting the overvoltage on the dc bus or condition indicative of the overvoltage caused by islanding.

19. The system of claim 12, wherein the controller is further configured to detect islanding of the DFIG generator and the DFIG converter and cause energy in the dc bus of the DFIG converter to be dissipated based on the detected islanding condition, said energy dissipated using the dynamic brake, wherein detecting, by the controller, islanding of a DFIG generator and a DFIG converter comprises detecting islanding by one or more of grid frequency deviation, grid voltage deviation, measured torque not following commanded torque for a predetermined time, turbine overspeed, tower vibration, or receiving a signal from an external device indicating status of grid connections.

20. The system of claim 12, wherein dissipating energy using the dynamic brake allows the usable speed range of the wind turbine to be expanded and dissipating energy using the dynamic brake aids in the response time of the wind turbine's pitch control system.

\* \* \* \* \*